United States Patent
Obendorf (12)

(10) Patent No.: US 6,431,206 B2
(45) Date of Patent: Aug. 13, 2002

(54) DEVICE FOR SELECTIVE FLOW CONNECTION OF EXHAUST PIPING OF CUTTING TOOLS TO AN EXHAUST FAN

(76) Inventor: Werner Obendorf, Preglstrasse 18, A-4020 Linz (AT)

( * ) Notice: Subject to any disclaimer, the term of this patent is extended or adjusted under 35 U.S.C. 154(b) by 0 days.

(21) Appl. No.: 09/779,062

(22) Filed: Feb. 8, 2001

(51) Int. Cl.$^7$ .......................... F16K 37/00; F16K 11/10
(52) U.S. Cl. ............................. 137/556.6; 137/625.11
(58) Field of Search ......................... 137/625.11, 556.6

(56) References Cited

U.S. PATENT DOCUMENTS

| | | | | | |
|---|---|---|---|---|---|
| 790,313 | A | * | 5/1905 | Redman | 137/625.11 X |
| 2,341,531 | A | * | 2/1944 | Dand | 137/625.11 |
| 2,516,425 | A | * | 7/1950 | Sarver | 137/625.11 |
| 2,536,199 | A | * | 1/1951 | McDonald | 137/625.11 X |
| 2,593,733 | A | * | 4/1952 | Davies | 137/625.11 |
| 2,617,622 | A | * | 11/1952 | White et al. | 137/625.11 |
| 2,830,564 | A | * | 4/1958 | Bryant | 137/625.11 |
| 2,979,082 | A | * | 4/1961 | Neves | 137/625.11 |
| 3,307,579 | A | * | 3/1967 | Beddoes | 137/625.11 X |
| 4,468,017 | A | * | 8/1984 | Pavone | 137/625.11 X |
| 4,948,095 | A | * | 8/1990 | Campau | 251/180 |

FOREIGN PATENT DOCUMENTS

DE 89 05 017 4/1989

* cited by examiner

Primary Examiner—John Rivell
(74) Attorney, Agent, or Firm—Collard & Roe, P.C.

(57) ABSTRACT

A device for selective flow connection of exhaust piping of cutting machinery having an exhaust fan is described, comprising a distributor connected on one side to the exhaust fan and on the other side to the exhaust piping and comprising a switching device for closing and opening the exhaust piping connected to the distributor. In the interests of creating advantageous structural conditions it is proposed that the distributor forms a pot-shaped housing (1) for the switching device, whose floor (2) bears the connection (3) for the exhaust fan and whose peripheral wall (4) bears the connections (5) for the exhaust piping, that the switching device presents a pot-shaped housing insert (6) which is connected to the housing floor (2) with its peripheral wall (8) enclosing the connection (3) for the exhaust fan and seals off the housing (1) with its floor (7) in the manner of a cover, and that a passageway (10) aligning in individual adjustable settings with a connection (5) for the exhaust piping is provided in the peripheral wall (8) of the rotatably adjustable housing insert (6) closing off the connections for the exhaust piping.

6 Claims, 2 Drawing Sheets

Figure 1:
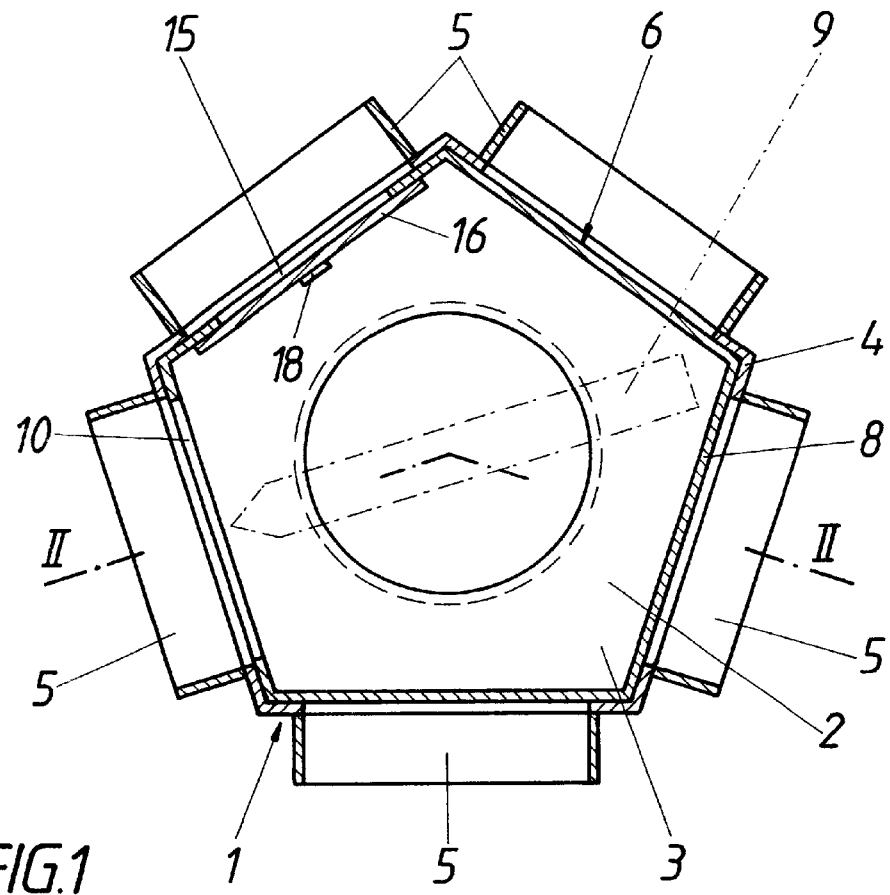

DEVICE FOR SELECTIVE FLOW CONNECTION OF EXHAUST PIPING OF CUTTING TOOLS TO AN EXHAUST FAN

FIELD OF THE INVENTION

The present invention relates to a device for selective flow connection of exhaust piping of cutting tools to an exhaust fan, comprising a distributor connected on one side to the exhaust fan and on the other side to the exhaust piping and comprising a switching device for closing and opening the exhaust piping connected to the distributor.

DESCRIPTION OF THE PRIOR ART

Cutting tools are provided with exhaust piping, which must be attached to an exhaust fan for eliminating the accumulating cuttings, for extracting the accumulated cutting waste which builds up with cutting tools. If a fan is provided the exhaust piping of the individual tools is to be connected alternately to the exhaust fan during use. This can occur in laborious fashion in that the respective exhaust piping is connected to the exhaust fan after the unrequired exhaust piping is extracted. Easier handling results from connecting the exhaust piping of all tools to the exhaust fan by way of a distributor, though in this case the distributor connections of the exhaust piping must be fitted with a switching device for opening and closing the connections; not only is this associated with considerable structural expense, but also enables fault circuits so that there is the danger that the required suction effect for extracting the accumulating cuttings of the machinery currently being operated is not available.

Similar disadvantages emerge in another known construction (DE 89 05 017 U1), wherein the connections for the exhaust piping of the cutting machinery are provided in the side walls of a rectangular housing which accommodates a flap for all connections operable by means of a separate servomotor. Because all connections of the housing are connected by way of a separate connector to the common exhaust fan, there is considerable structural expense which, according to the number of connections opened by the flaps, attracts different suction effects for the connected exhaust piping.

SUMMARY OF THE INVENTION

The object of the invention is to design a device for selective flow connection of exhaust piping of cutting machinery to an exhaust fan of the type initially described, such that switching errors are excluded by means of simple structural means.

The invention solves this problem, whereby the distributor forms a pot-shaped housing for the switching device, whose floor bears the connection for the exhaust fan and whose peripheral wall bears the connections for the exhaust piping, the switching device presents a pot-shaped housing insert which is connected to the housing floor with its peripheral wall enclosing the connection for the exhaust fan and seals off the housing with its floor in the manner of a cover, and whereby a passageway aligning in individual adjustable settings with a connection for the exhaust piping is provided in the peripheral wall of the rotatably adjustable housing insert closing off the connections for the exhaust piping.

As a consequence of these measures the housing insert of the switching device connects the connection of the exhaust fan in each of its adjustable positions by means of the passageway in the peripheral wall with only one of the connections for the exhaust piping, effectively excluding any defective flow connections between the exhaust fan and several tools. Despite this forced control very simple structural ratios result because the pot-shaped housing insert closes off the similarly pot-shaped housing in the manner of a cover and tightly and adequately seals off the connection for the exhaust fan in the floor of the pot-shaped housing with the free end of the peripheral wall. In this respect it must be considered that as a result of the subpressure prevalent in the pot-shaped housing the housing insert is drawn into the housing top. No special sealing seat is thus required to ensure adequate tightness between the housing insert and the housing. In the case of greater demands on tightness sealing inserts are sufficient, for example in the form of felt inserts or similar. The pot-shaped housing can turn out to be relatively small, because provision has to be made for the connections of the exhaust piping only along the peripheral wall of the housing.

Particularly simple connection conditions are prevalent when the pot-shaped housing presents the form of a regular prism. In this case a uniform connection surface is available for each connection of the exhaust piping. If the exhaust piping has an identical diameter, the side surfaces of the prism may have a square shape matching the diameter of the exhaust piping. In the event of differing diameters of the exhaust piping the side surfaces of the prism are to naturally fit the largest connection diameter. Such a prismatic housing shape allows a modular housing structure made up of separate connection plates which are to be connected to a floor in the shape of a regular rectangle. The housing insert of the switching device can, according to the prismatic shape of the housing, also be prismatic in design, such that the different adjustable positions, in which the housing insert can be interlocked in the housing, can result from the prismatic shape. For the housing insert to be rotated it must be withdrawn from the housing before it can be reset axially into the housing after a corresponding rotatable adjustment.

If importance is attached to a rotary bearing of the housing insert to its rotatable adjustment, the housing of the switching device can present a cylindrical form and be set into a cylindrical housing. But it is also feasible to utilize the advantages of a prismatic housing in conjunction with a cylindrical housing insert if the prismatic housing takes up a corresponding bearing cartridge for the rotatable bearing of the housing insert. In such a case, in the interests of ensuring a sufficiently tight connection of the connections for the exhaust piping in the peripheral wall of the prismatic housing on the one hand, and cylindrical housing insert on the other, the bearing cartridge for the prismatic housing may present radial partitions between the side edges of the prismatic housing and the peripheral wall of the cylindrical housing insert. Connecting chambers separated from one another inside the housing are formed by these partitions located between the housing insert and the individual connections of the exhaust piping.

Because the respective rotatable adjustment of the housing insert of the switching device determines the connection of one of the intake pipes to the exhaust fan, the respective flow connection can be established easily by the housing insert presenting an actuating handle pointing in the direction of the passageway and located on the outside of the floor.

If machinery is used requiring extraction of cuttings on both sides the exhaust fan is to be connected with two exhaust pipes belonging to this machinery. This can be considered in a housing insert swivel-mounted in the housing by interposition of the housing insert, whereby the passageway in the peripheral wall of the housing insert frees up the flow path to two adjoining connections in the peripheral wall of the housing. Such interposition is, however, not possible in prismatic housing inserts. For intake pipes to be connected to the exhaust fan in pairs in this embodiment the peripheral wall of the prismatic housing insert can present another sealable passageway with an optionally openable cover on an additional side surface so that this additional passageway can be freed up as required.

BRIEF DESCRIPTION OF THE DIAGRAM

Figure 2:
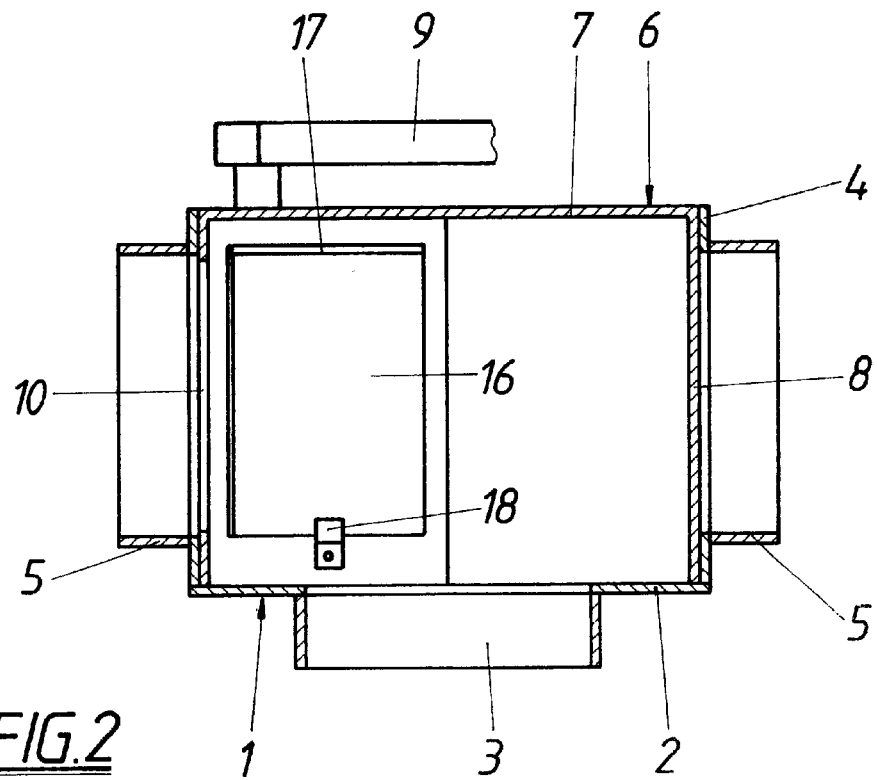
Figure 3:
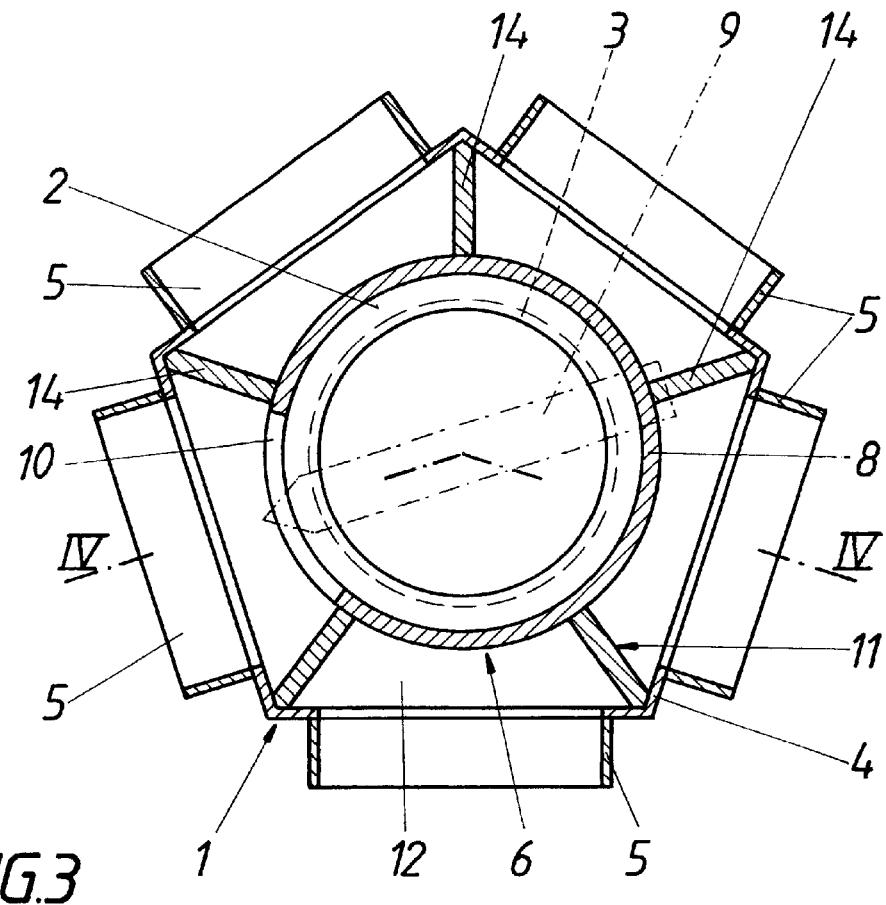
Figure 4:
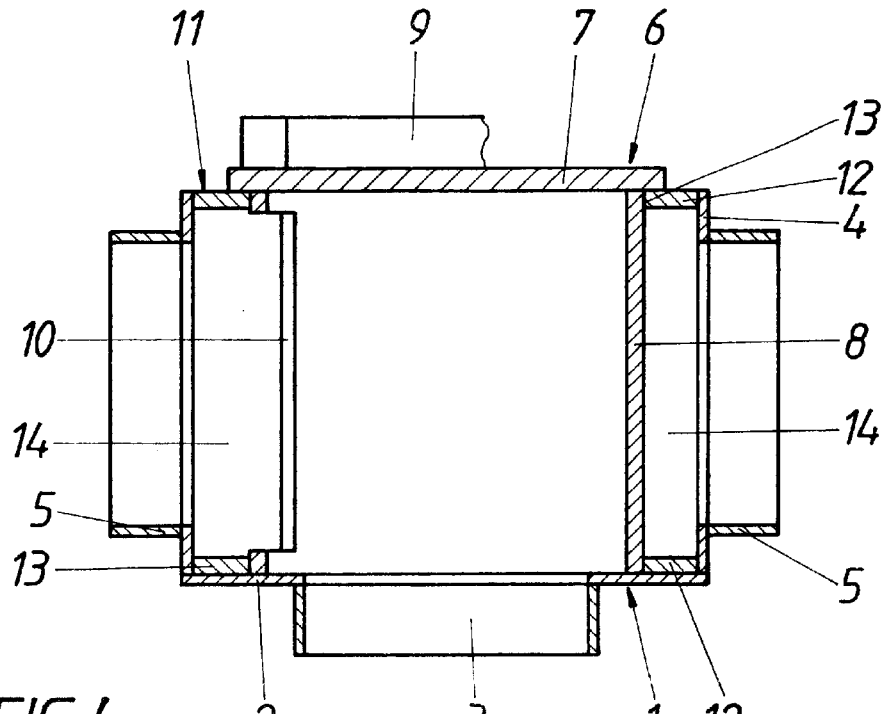

The diagram illustrates the inventive object, in which:

FIG. 1 shows a device according to the present invention for selective flow connection of exhaust piping of cutting machinery having an exhaust fan, in a simplified section perpendicular to the housing axis, FIG. 2 shows a section along line II—II of FIG. 1, FIG. 3 shows a representation of a structural variant, and FIG. 4 shows a section along line IV—IV of FIG. 3.

DESCRIPTION OF THE PREFERRED EMBODIMENTS

According to the embodiment according to FIGS. 1 and 2 the device exhibits a pot-shaped housing 1 which forms a floor 2 together with a tubular connection 3 for an exhaust fan. Projecting from housing floor 2 which has the form of a regular polygon, a pentagon in the embodiment, is a prismatic peripheral wall 4 which form square side walls with each centric tubular connection 5 for exhaust piping of cutting machinery. Set into this pot-shaped housing 1 open at the front side is a likewise pot-shaped housing insert 6 whose floor 7 closes off the open front side of housing 1 in the manner of a cover, while the free edge of peripheral wall 8 of housing insert 6 adjoins floor 2 of housing 1 and encloses connection 3 for the exhaust fan, as is evident from FIG. 2. Since pot-shaped housing insert 6 depicts a prism with external dimensions, corresponding to the internal dimensions of the prism of housing 1, according to the embodiment in FIG. 1, housing insert 6 can be set into housing 1 to interlock in an axial direction by means of an actuation handle 9, whereby peripheral wall 8 closes off connections 5 for the intake pipes with the exception of one connection 5, because in the vicinity of a side surface in peripheral wall 8 housing insert 6 exhibits a passageway 10 covered with connection 5 of adjoining the side surface of housing 1. One of connections 5 is connected to connection 3 for the exhaust fan by means of housing insert 6, and independently of the respective adjustable position of housing insert 6. Housing insert 6 has to be withdrawn from housing 1 for selection of connection 5 to be connected with connection 3 for the exhaust fan and returned to housing 1 after corresponding rotational adjustment. Since actuation handle 9 points in the direction of passageway 10 in peripheral wall 8 of housing insert 6, the result is simple indication for the respective flow connection between the exhaust fan and the selected intake pipe.

So that housing insert 6 does not have to be removed from housing 1 and re-inserted after a rotatable adjustment for transposing the switching device, housing insert 6 can be swivel-mounted in housing 1, as illustrated in the embodiment according to FIGS. 3 and 4. For this purpose a bearing insert is provided in prismatic housing 1, which bears front plates 12 fitting the inner cross-section of housing 1 with bearing recesses 13 for bearing insert 6 whose cylindrical peripheral wall 8 exhibits an external diameter matching bearing recesses 13. This is how bearing insert 6 is held freely pivoting in housing 1. Care must be taken that one only flow connection is permitted with one of connections 5 for the exhaust piping of the machinery, by way of passageway 10 in peripheral wall 8 of housing insert 6. This can be ensured simply by partitions 14 which run out from the side edges of the prismatic housing and extend radially to cylindrical wall 8 of housing insert 6, as is evident from FIG. 3. Said partitions 14 thus subdivide housing 1 in the annular region between peripheral wall 4 of housing 1 and peripheral wall 8 of housing insert 6 into separate chambers, such that simple flow connection is again ensured by these partitions between connection 3 for the exhaust fan and one of connections 5 for the exhaust piping.

Should two exhaust pipes be assigned to one cutting machine, this exhaust piping can be connected to two adjoining connections 5 of housing 1 in order to be able to connect both said connections 5 with the exhaust fan in an intermediate position of rotatable housing insert 6. Such an intermediate position understandably possible only with a bearing insert 6 swivel-mounted in housing 1. With a prismatic bearing insert 6 according to the embodiment according to FIGS. 1 and 2, in order to be able to fabricate such a flow connection between connection 3 for the exhaust fan and two adjacent connections 5 for a pair of exhaust pipes assigned to a machine, peripheral wall 8 of prismatic housing insert 6 can present another passageway 10 closed off by an openable cover 16 on an additional side surface, for example on one of both side surfaces directly adjoining passageway 10. Cover 16 can be opened as required and the additional connection can be established. Cover 16 he hinged for this purpose by a hinge joint 17 on peripheral wall 8 of bearing insert 6 and can be locked using a rotatable locking bolt 18 in the closed position.

It is understood that the invention is limited to the abovedescribed embodiment only. The prism shape of the number of exhaust pipes to be connected can therefore be adapted accordingly. There is, however, the possibility of combining a cylindrical housing with a cylindrical bearing insert 6, instead of a prismatic housing 1, to ensure the rotatable adjustment capability of bearing insert 6 in a simple manner. For this case connections 5 are to be provided on cylindrical peripheral wall 8 of housing 1.

What is claimed is:

1. A device for selective flow connection of exhaust piping of cutting machinery having an exhaust fan, comprising a distributor connected on one side to the exhaust fan and on the other side to the exhaust piping, and a switching device for closing and opening the exhaust piping connected to the distributor, wherein the distributor forms a pot-shaped housing in the form of a regular prism for the exhaust fan and whose peripheral wall bears the connection for the exhaust piping, the switching device having a pot-shaped prismatic housing insert which can be inserted into the pot-shaped housing and interlocked in various adjustable positions, and which is connected to the housing floor with its peripheral wall enclosing the connection for the exhaust fan and seals off the housing with its floor in the manner of a cover, and a passageway aligning in individual adjustable settings with a connection for the exhaust piping is provided in the peripheral wall of the rotatably adjustable housing insert closing off the connections for the exhaust piping.

2. A device as claimed in claim 1, wherein the housing insert of the switching device has an actuating handle pointing in the direction of the passageway and located on the outside of the floor.

3. A device as claimed in claim 1, wherein the peripheral wall of the prismatic housing insert has a sealable passageway with an optionally openable cover on an additional side surface.

4. A device for selective flow connection of exhaust piping of cutting machinery having an exhaust fan, comprising a distributor connected on one side of the exhaust fan and on the other side to the exhaust piping, and a switching device for closing and opening the exhaust piping connected to the distributor, wherein the distributor forms a pot-shaped housing in the form of a regular prism for the switching device, whose floor bears the connection for the exhaust fan and whose peripheral wall bears the connections for the exhaust piping, the switching device having a pot-shaped cylindrical housing insert which is swivel-mounted in a bearing insert of the prismatic housing and which is connected to the housing floor exhaust fan and seals off the housing with its floor in the manner of a cover, and a passageway aligning in individual adjustable settings with a connection for the exhaust piping is provided in the peripheral wall of the rotatably adjustable housing insert closing off the connections for the exhaust piping.

5. A device as claimed in claim 4, wherein the housing insert for the prismatic housing has radial partitions between the side edges of the prismatic housing and the peripheral wall of the cylindrical housing insert.

6. A device as claimed in claim 4, wherein the peripheral wall of the prismatic housing insert has a sealable passageway with an optionally openable cover on an additional side surface.

* * * * *